United States Patent
Beltramin et al.

(10) Patent No.: US 11,999,241 B2
(45) Date of Patent: Jun. 4, 2024

(54) HYBRID SYSTEM TO OVERHAUL A DC LOCOMOTIVE

(71) Applicant: Progress Rail Services Corporation, Albertville, AL (US)

(72) Inventors: Sidarta Beltramin, Curitiba (BR); Guilherme Martini, Curitiba (BR)

(73) Assignee: Progress Rail Services Corporation, Albertville, AL (US)

( * ) Notice: Subject to any disclaimer, the term of this patent is extended or adjusted under 35 U.S.C. 154(b) by 198 days.

(21) Appl. No.: 17/493,460

(22) Filed: Oct. 4, 2021

(65) Prior Publication Data

US 2023/0106803 A1    Apr. 6, 2023

(51) Int. Cl.

| | | |
|---|---|---|
| *B60L 15/20* | (2006.01) | |
| *B60L 3/02* | (2006.01) | |
| *B60L 15/00* | (2006.01) | |
| *B60L 15/04* | (2006.01) | |
| *B60L 50/15* | (2019.01) | |
| *B60L 50/30* | (2019.01) | |
| *B60L 50/50* | (2019.01) | |
| *B61C 3/02* | (2006.01) | |
| *H02P 7/298* | (2016.01) | |

(52) U.S. Cl.
CPC ......... *B60L 15/2045* (2013.01); *B60L 15/007* (2013.01); *B60L 15/04* (2013.01); *B60L 15/2009* (2013.01); *B60L 50/15* (2019.02); *B60L 50/30* (2019.02); *B60L 50/50* (2019.02); *B61C 3/02* (2013.01); *H02P 7/298* (2013.01); *B60L 2200/26* (2013.01)

(58) Field of Classification Search
CPC .... B60L 15/2045; B60L 15/007; B60L 15/04; B60L 15/2009; B60L 50/15; B60L 50/30; B60L 50/50; B60L 2200/26; B61C 3/02; H02P 7/298
See application file for complete search history.

(56) References Cited

U.S. PATENT DOCUMENTS

| | | | |
|---|---|---|---|
| 7,124,691 B2 | 10/2006 | Donnelly et al. | |
| 9,193,268 B2 | 11/2015 | Kumar | |
| 2008/0246338 A1* | 10/2008 | Donnelly | B61C 7/04 307/53 |
| 2008/0290825 A1 | 11/2008 | St-Jacques et al. | |
| 2021/0057978 A1* | 2/2021 | Song | B60L 3/003 |

FOREIGN PATENT DOCUMENTS

CN    101274594 A    10/2008

* cited by examiner

*Primary Examiner* — Joseph Ortega

(57) ABSTRACT

A locomotive, a first chopper circuit, and a second chopper circuit integrating a traction motor with an energy storage device are disclosed. The locomotive includes a prime mover, an energy management device, a DC power bus, a traction motor, an energy storage device, a resistor grid, and a chopper circuit. Each chopper circuit is controlled by the energy management device and includes a plurality of power semiconductors with variable switching frequency. The traction motor may be capable of operating in a motoring mode, where power is controllably supplied by either the prime mover and/or the energy storage device; and a dynamic braking mode, where generated power is controllably allocated to the energy storage device and/or the resistor grid.

19 Claims, 10 Drawing Sheets

HYBRID SYSTEM TO OVERHAUL A DC LOCOMOTIVE

TECHNICAL FIELD

The present disclosure generally relates to locomotives and, more specifically, to a chopper circuit for integrating an energy storage device into an internal combustion locomotive.

BACKGROUND

FIG. 1 is a block diagram of an exemplary prior art internal combustion locomotive 100. For the purposes of this disclosure, the term 'locomotive' shall hereinafter specifically refer to locomotives comprising both an internal combustion engine and electric motors, such as diesel-electric locomotives and petrol-electric locomotives, and should be distinguished from locomotives comprising purely mechanical power trains, such as diesel-mechanical locomotives.

As seen in FIG. 1, a typical prior art locomotive 100 may comprise an engine 110 or prime mover mechanically coupled to a converter 120. The converter may be a combination of an alternator, which converts mechanical energy to alternating current (AC); and a rectifier, which rectifies the AC into direct current (DC). DC power is thereafter operatively supplied to a plurality of traction motors 140, which convert the electric power to mechanical torque and propel the locomotive 100. In many common configurations, each traction motor 140 may be mechanically coupled to an axle 160 and pair of wheels 170. It may thus be appreciated that no direct mechanical connection exists between the prime mover 110 and the wheels 170 in the locomotive 100.

Turning now to prior art FIG. 2, electric power may be supplied to the traction motors 140 through a power bus 150, which may be a DC power bus. The power bus 150 may include a plurality of switchgears, contactors, circuit breakers, and other components which control the flow of electric power. It is further worth noting that, depending on the configuration, the traction motors 140 may be supplied by DC power, i.e. DC traction motors; or AC power, i.e. AC traction motors. As depicted in FIG. 2, wherein AC traction motors are implemented, one or more inverters 130 may convert the DC power from the power bus 150 to AC power before being supplied to the AC traction motors 140. However, in the former case, wherein DC traction motors are implemented, the inverters 130 may be understandably obviated.

According to the art, a traction motor 140 may typically comprise a rotating armature, including a plurality of coils wound around a central shaft; a field winding, including a plurality of coils surrounding the rotating armature; a commutator; and brushes. The commutator and brushes may electrically connect the armature to the field winding and operatively control the direction of current flow. Traction motors are often series-wound DC motors, i.e. the armature and the field winding are connected in series, a configuration which provides high starting torque that decreases as the motor accelerates in speed. However, traction motors may also be DC shunt motors, i.e. the armature and the field winding are connected in parallel, a configuration which maintains constant motoring speed regardless of the applied load.

Since the components of the DC motor and a generator are mechanically comparable, the traction motor 140 may further implement dynamic braking functionality. Simply stated, while braking the locomotive 100, torque may be transferred from the wheels 170 and axle 160 to the armature, whose rotation relative to the field winding generates electrical current which may be returned to the power bus 150. This phenomenon is exploited in dynamic braking mechanisms, which may include 'rheostatic braking' and/or 'regenerative braking' mechanisms.

According to the art, during rheostatic braking, electrical power generated from the traction motor 140 is dissipated as heat, for example, across one or more resistive elements. Prior art FIG. 2 shows an exemplary configuration including a braking grid 160, wherein one or more resistive elements 161 are connected in series and/or parallel across the power bus 150 through a plurality of contactors DB1-DB5. Each series grouping of resistors, commonly referred to as strings, may further comprise one or more cooling elements 162, such as heat sinks, cooling fans, and the like. It may be understood that in the exemplary configuration shown and, indeed, according to rheostatic braking in general, the electrical energy generated from dynamic braking is essentially wasted.

According to the art, during regenerative braking, electrical power generated from the traction motor 140 may instead be recaptured by the locomotive 100. For example, the locomotive 100 may come equipped with an energy storage device, or it may be electrically connected to an external power rail. Unfortunately, the efforts herein have thus far been overly complex, costly, and unable to transfer power between the traction motor 140 and the energy storage device in an efficient and precisely controlled manner.

FIG. 3 shows an embodiment taught by U.S. Pat. No. 9,193,268, designed by Ajith Kumar and assigned to the General Electric Company. Kumar discloses a diesel-electric locomotive 200 comprising a traction bus 230, one or more traction motor subsystems 240, a battery storage 250, and a braking grid 260, which together facilitate rheostatic and regenerative functionality during dynamic braking. More specifically, braking grid 260, which includes a plurality of resistive elements 261, is controllably connected to the traction bus 230 via a plurality of contactors DB1-DB5. According to Kumar, the battery storage 250 may be directedly charged by the energy outputted by the traction motors 240 via the traction bus 230. The braking grid 260 may further dissipate a proportion of the generated energy through discretionary switching of contactors DB1-DB5.

Unfortunately, in Kumar, it may be understood that a voltage supplied to the battery storage 250 is equal to an applied voltage to the traction bus 230, and thus cannot be manipulated without yet additional circuit elements. Moreover, the current supplied to the battery storage 250 may only be indirectly controlled through opening and closing contactors DB1-DB5 (which allocate current to the braking grid 260). Since contactors DB1-DB5 may operate only in an open state or a closed state, likewise, power may only be allocated to the energy storage 250 according to these two states, with no finer range of control. Thus, the prior art circuit may be incapable of precise charge balancing between the battery storage 250 and the braking grid 260 during dynamic braking, which can impair an efficiency of the locomotive 200.

Accordingly, there remains a need in the art for a circuit design that integrates an energy storage device into a locomotive, the circuit being capable of controlling the voltage and current supplied to the traction motors, an energy storage device, and a resistor grid with high precision and speed, thereby providing improved dynamic braking functionality at low cost.

SUMMARY OF THE DISCLOSURE

According to a first aspect of the present disclosure, a locomotive is disclosed. The locomotive comprises a prime mover; a converter mechanically coupled to the prime mover; an energy management device; and a DC power bus being supplied electric power by the converter. The DC power bus is controllably connected through a chopper circuit to: a traction motor capable of operating in a motoring mode and a dynamic braking mode; an energy storage device capable of capturing electric power from and supplying electric power to the DC power bus; and a resistor grid capable of dissipating electric power as heat. The chopper circuit includes a plurality of power semiconductors, each having a variable switching frequency. Further, the chopper circuit is controlled by the energy management device to control a current supplied to each of the traction motor, the energy storage device, and the resistor grid.

According to a second aspect of the present disclosure, a chopper circuit for a locomotive is disclosed. The chopper circuit comprises a DC power bus including a positive line and a negative line; an energy storage device connected across the positive line and the negative line, wherein the energy storage device is capable of charging power from and discharging power to the DC power bus; and a DC shunt motor capable of operating in a motoring mode and a dynamic braking mode. The DC shunt motor includes: an armature connected across the positive line and the negative line and a field winding controllably connected across the positive line and the negative line. The chopper circuit further comprises a resistor grid controllably connected across the positive line and the negative line; and a plurality of power semiconductors, each having a variable switching frequency, which control a current through each of the armature, the field winding, the energy storage device, and the resistor grid.

According to a third aspect of the present disclosure, a chopper circuit for a locomotive is disclosed. The chopper circuit comprises a DC power bus including a positive line and a negative line; an energy storage device connected across the positive line and the negative line, wherein the energy storage device is capable of charging power from and discharging power to the DC power bus; and a series-wound DC motor capable of operating in a motoring mode and a dynamic braking mode. The series-wound DC motor includes: an armature having a first terminal and a second terminal; and a field winding having a first terminal and a second terminal, wherein the field winding is controllably connected in series with the armature across the positive line and the negative line. The chopper circuit further comprises a resistor grid having a first terminal and a second terminal, wherein the first terminal of the resistor grid is connected to the first terminal of the armature; a first switch connecting the second terminal of the armature to the positive line; a second switch connecting the second terminal of the armature to the second terminal of the resistor grid; and a plurality of power semiconductors, each having a variable switching frequency, which control a current through each of the armature, the field winding, the energy storage device, and the resistor grid.

These and other aspects and features of the present disclosure will be more readily understood after reading the following description in conjunction with the accompanying drawings.

DETAILED DESCRIPTION

Figure 1:
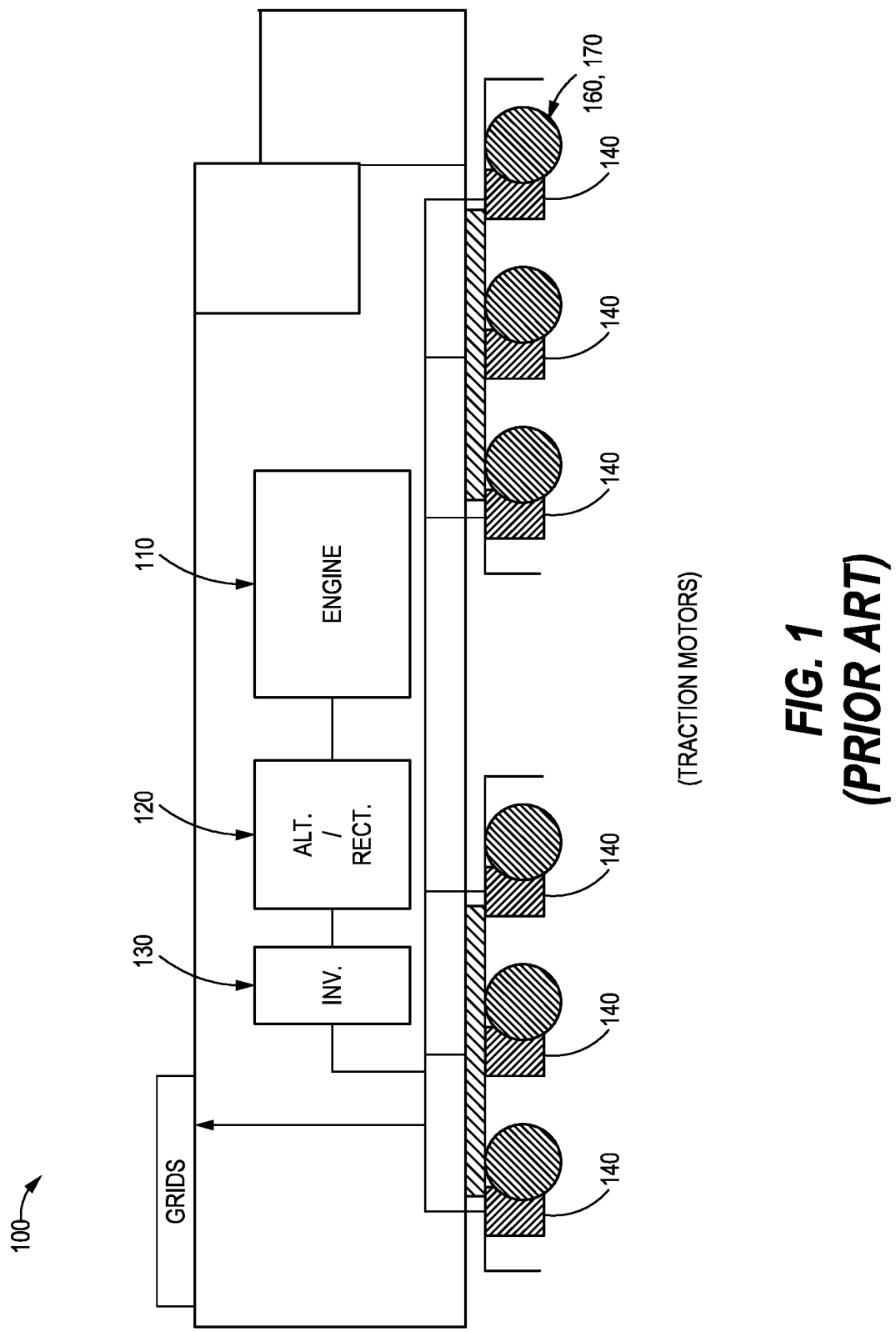
FIG. 1 is a diagram of an exemplary diesel-electric locomotive according to the prior art.
Figure 2:
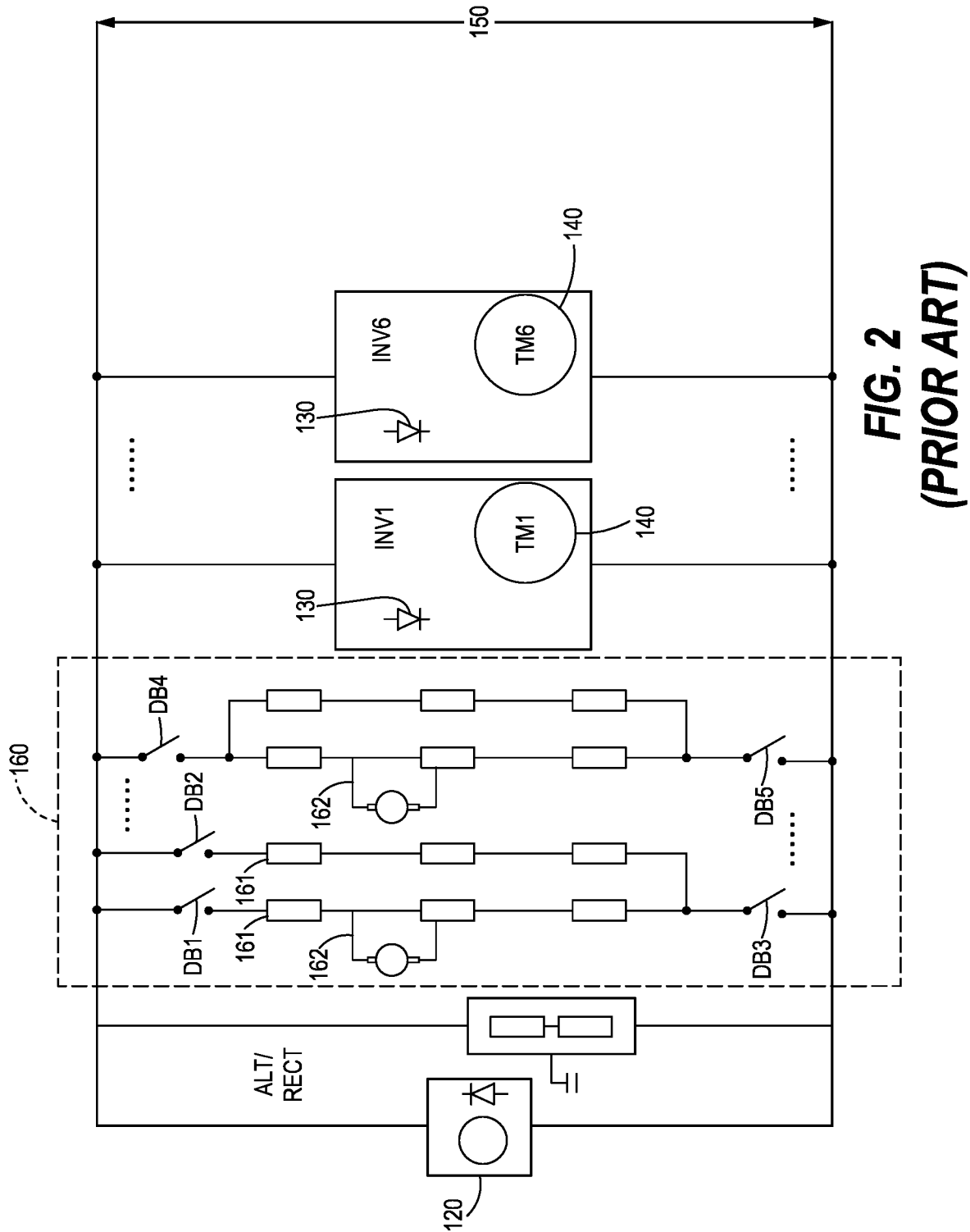
FIG. 2 is an electrical schematic of a first exemplary power bus for a diesel-electric locomotive according to the prior art.
Figure 3:
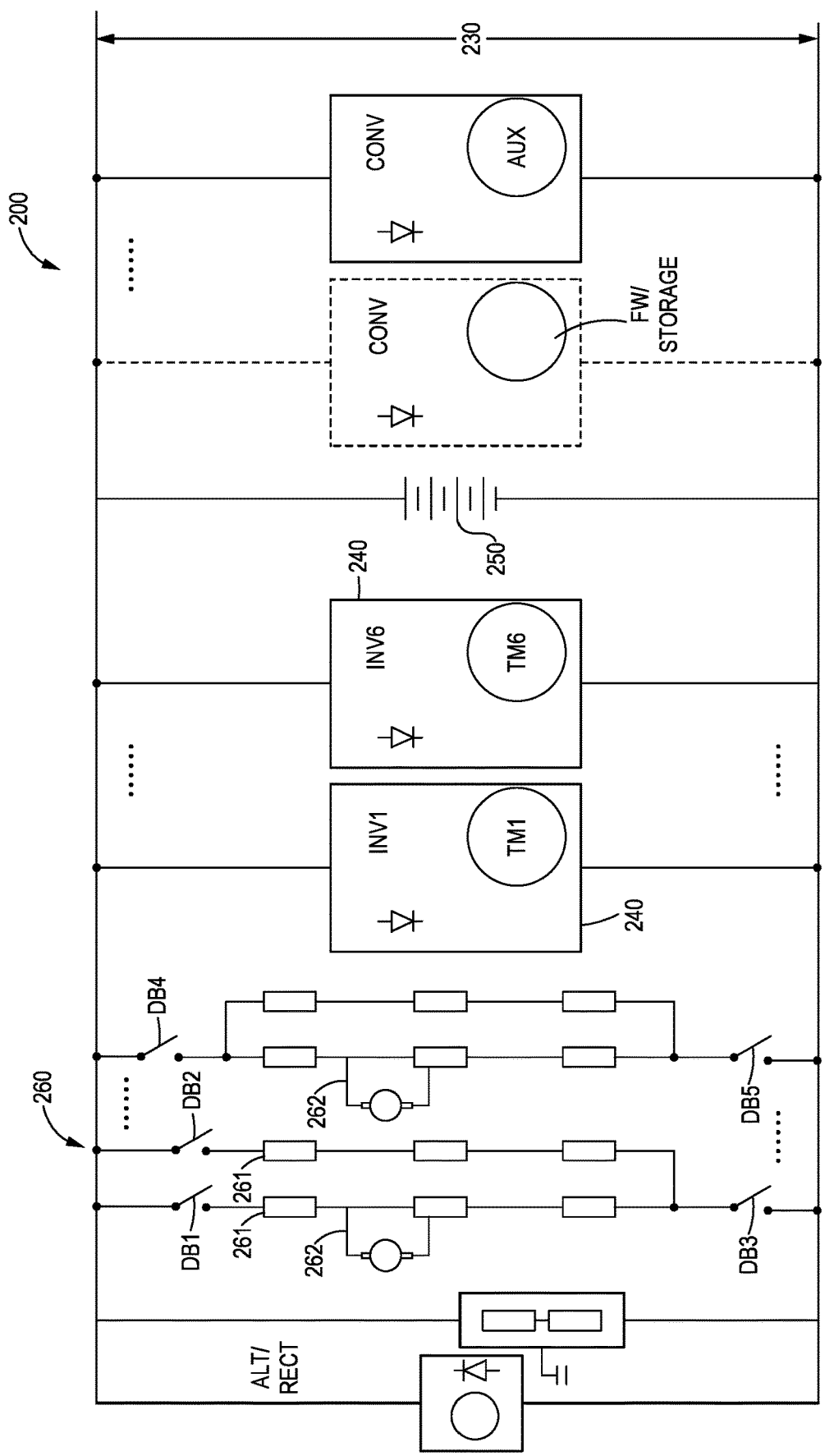
FIG. 3 is an electrical schematic of a second exemplary power bus for a diesel-electric locomotive according to the prior art.
Figure 4:
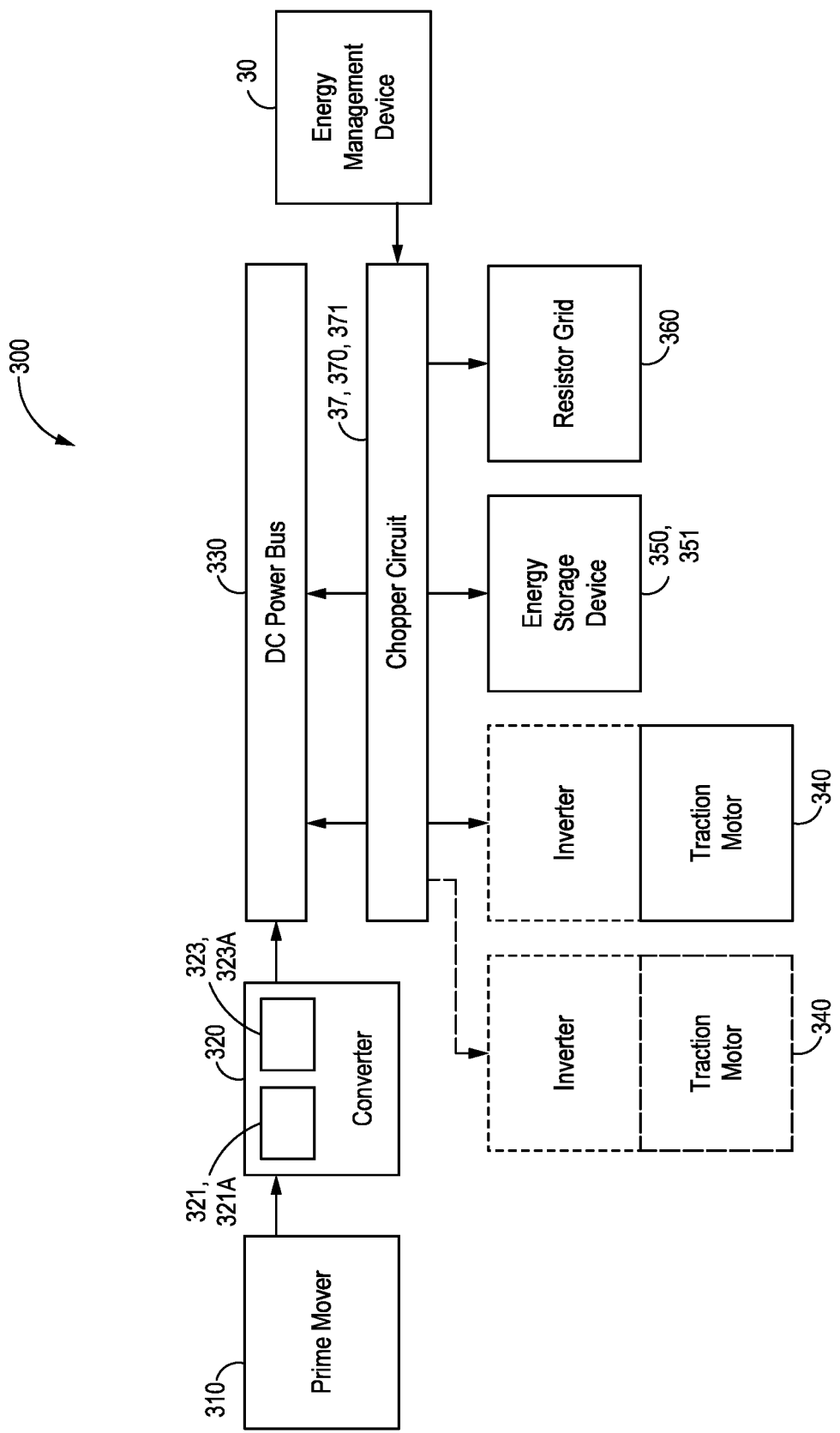
FIG. 4 is a diagram of an exemplary diesel-electric locomotive according to an embodiment of the present disclosure.

Referring now to the drawings and with specific reference to FIG. 4, a locomotive is generally referred to by a reference numeral 300. The locomotive 300 may be operatively propelled by both an internal combustion engine and electric motors. For example, the locomotive 300 may be diesel-electric locomotive, petrol-electric locomotive, or comparable hybrid locomotive; it may burn natural gas, petroleum, petrol, diesel, biodiesel, biomass, distillates, and yet other fossil fuels and fossil fuel alternatives; and it may employ DC traction motors operatively powered by the internal combustion engine. Further, the locomotive 300 may be employed in any number of environments, such as but not limited to passenger trains, freight trains, shunters, and the like.

As shown in FIG. 4, the locomotive 300 may specifically comprise a prime mover 310, a converter 320 mechanically coupled to the prime mover, an energy management device 30, and a DC power bus 330 being supplied electric power by the converter 320. As discussed above, the prime mover 310 may be an internal combustion engine, such as a diesel engine, but may also utilize alternative fuel types. The converter 320 may be a combination of an alternator 321 and a rectifier 323, the former converting mechanical torque from the prime mover 310 into AC power, and the latter converting AC power to the DC power supplied to the DC power bus 330. In some embodiments, the converter 320 may consist of a three-phase alternator 321A, and the rectifier 323 may consist of a three-phase rectifier 323A, such as a full-wave silicon rectifier.

The locomotive 300 may further comprise at least one traction motor 340, an energy storage device 350, and a resistor grid 360, each electrically and controllably connected to the DC power bus 330. The traction motor 340 may be capable of operating in a motoring mode, i.e. as an electric motor; and in a dynamic braking mode, i.e. as an alternator. Analogously, the energy storage device 350 may be capable of capturing electrical power from the DC power bus 330, i.e. charging; and supplying electric power to the DC power bus 330, i.e. discharging. The resistor grid 360 may be capable of dissipating electric power supplied by the DC power bus 330 in the form of heat.

According to some embodiments, the locomotive 300 may further comprise a second prime mover (not shown) and/or an external power source (not shown), such as an electric rail. Either or both may operatively supply electric power to the DC power bus 330, which may be in addition to or in supplement to the power supplied by the prime mover 310. According to the same or other embodiments, the locomotive 300 may further comprise one or more auxiliary power systems (not shown). The auxiliary power systems, which may include lighting systems, air conditioning or heating systems, entertainment or infotainment systems, etc., may be supplied electric power from the DC power bus 330, or may utilize external power supplies. It may be understood that additional infrastructure may be provided to interface the second prime mover, external power source, and/or auxiliary power systems with the DC power bus 330, which will not be further discussed by the present disclosure nor limited herein.

With continued reference to FIG. 4, the DC power bus 330, the traction motor 340, the energy storage device 350, and the resistor grid 360 may be controllably connected through a chopper circuit 37. More specifically, the chopper circuit 37 may include a plurality of power semiconductors 370, each having a variable switching frequency. The switch state and/or the switching frequency of each power semiconductor 370 may control a voltage, current, and/or power supplied to each of the traction motor 340, the energy storage device 350, and the resistor grid 360. In some embodiments, the chopper circuit 37 and the power semiconductors 370 therein may be controlled by the energy management device 30.

As previously discussed, the traction motor 340 may be capable of operating in either the motoring mode or the dynamic braking mode. During the motoring mode, the energy management device 30 may control the chopper circuit 37 to manage a voltage, current and/or power supplied to the traction motor 340 by the DC power bus 330. During the dynamic braking mode, the energy management device 30 may control the chopper circuit 37 to manage a voltage, current, and/or power supplied by the traction motor 340 to the DC power bus 330. Moreover, the energy management device 30 may control the chopper circuit 37 to control a voltage, current, and/or power supplied to the energy storage device 350 and the resistor grid 360, effectively balancing a power distribution between the two components.

With the above in mind, it is envisioned that the locomotive 300 can operate in one of at least four operating modes, depending on the power requirements of the traction motor 340 and its mode of operation.

According to a first operating mode, the traction motor 340 operates in the motoring mode and a traction power requirement may be equal to the power output of the prime mover 310. In such cases, the energy management device 30 may control the chopper circuit 37 to supply power to the traction motor 340 through the DC power bus 330 such that the traction motor 340 is supplied power exclusively from the prime mover 310.

According to a second operating mode, the traction motor 340 operates in the motoring mode and a traction power requirement may exceed the power output of the prime mover 310. In such cases, the energy management device 30 may control the chopper circuit 37 to supply power to the traction motor 340 through the DC power bus 330 such that the traction motor 340 is supplied power in parallel from both the prime mover 310 and the energy storage device 350. In some embodiments, a power insufficiency of the prime mover 310 may be exactly supplemented by the energy storage device 350, although other distributions are also possible and imagined.

According to a third operating mode, the traction motor 340 operates in the motoring mode and a power output of the prime mover 310 is zero. In such cases, the energy management device 30 may control the chopper circuit 37 to supply power to the traction motor 340 through the DC power bus 330 such that the traction motor 340 is supplied power exclusively from the energy storage device 350.

Finally, according to a fourth operating mode, the locomotive 300 is braking, the traction motor 340 operates in the dynamic braking mode, and a power output of the prime mover 310 is zero. In such cases, the energy management device 30 may control the chopper circuit 37 to transfer electric power outputted from the traction motor 340 to the energy storage device 350 and to the resistor grid 360 through the DC power bus 330. In some embodiments, the chopper circuit 37 may further control a voltage, current, and/or power supplied to each of the energy storage device 350 and the resistor grid 360, thereby distributing the power allocated to both elements.

It should be noted that additional operating modes are also envisioned and may be implemented with the locomotive 300 without departing from the scope of the present disclosure. For example, operating modes of the locomotive 300 may exist wherein electric power is supplied in parallel from the DC power bus 330 and the traction motor 340 (in dynamic braking mode). And in other operating modes, power may be supplied or captured from an external source and/or additional energy storage devices.

According to some embodiments, the locomotive 300 may further comprise a plurality of traction motors 340, each electrically connected through a chopper circuit 37 to the DC power bus 330, and each being capable of operating in the motoring mode and the dynamic braking mode. For example, one traction motor 340 may be paired with each axle and wheel pair (not shown) of the locomotive 300. It is further envisioned that each traction motor 340 may be a DC traction motor, such as a series-wound DC motor or a DC shunt motor; or an AC traction motor electrically coupled to an inverter. In the latter case, for example, one inverter may be paired with each AC traction motor, axle, and wheel pair. Of course, it may be appreciated that any combination of the above elements may be included in the locomotive 300, depending on specific applicational requirements.

In some embodiments, the energy storage device 350 may be a rechargeable battery, such as one employing lithium-ion, lead-acid, nickel cadmium, or nickel-metal hydride chemistries. The energy storage device 350 may also manifest alternative technologies common to the art, such as but not limited to flywheels 351, ultracapacitors, compressed air, hydrogen storage, and the like; and/or the energy storage device 350 may employ some combination of the above. In any embodiment, it may be understood that additional infrastructure may be provided to interface the energy storage device 350 with the DC power bus 330, such as but not limited to switches, contactors, relays, converters, and the like, which will not be further discussed by the present disclosure nor limited herein.

As discussed above, the locomotive 300 comprises a chopper circuit 37 including a plurality of power semiconductors 370 being controlled by the energy management device 30. For the purposes of this disclosure, a chopper circuit may refer to an electrical circuit which directly converts a fixed DC input voltage (for example, being supplied by the DC power bus 330) to a variable DC output voltage (for example being supplied to the components connected to the DC power bus 330). In many cases, an average value of the voltage outputted by the chopper circuit 37 may be controlled by a switching frequency of the switches employed in the chopper circuit 37, e.g. the power semiconductors 370.

Accordingly, each power semiconductor 370 may include a collector terminal, an emitter terminal, and a gate terminal. Each power semiconductor 370 may be in an open state, a closed state, or a switching state; and the switch state and switching frequency of each power semiconductor 370 may be controlled by gate signals received through the gate terminal and supplied by the energy management device 30. According to some embodiments, some or all of the power semiconductors 370 comprising the chopper circuit 37 may manifest as power MOSFETS, gate turn-off thyristors (GTOs), insulated-gate bipolar transistors (IGBTs) 371, and other comparable, 3-terminal switching devices with reverse voltage blocking properties. In the same or other embodiments, the gate signal may be a pulse-width modulation (PWM) signal or a frequency modulation signal that controls a duty cycle of the power semiconductor 370, although other techniques are also possible and envisioned.

Furthermore, the energy management device 30 may be a controller, microcontroller, embedded PC, field programmable gate array (FPGA), application-specific integrated circuit (ASIC), or comparable computing device, which may include at least a memory unit (not shown) and a processing unit (not shown). The gate signals supplied by the energy management device 30 may be based on a preprogrammed algorithm, lookup table, computer program, and other possible software and/or hardware processes, which may be stored on the memory of the energy management device 30, and which may be determined by specific applicational requirements.

Figure 5:
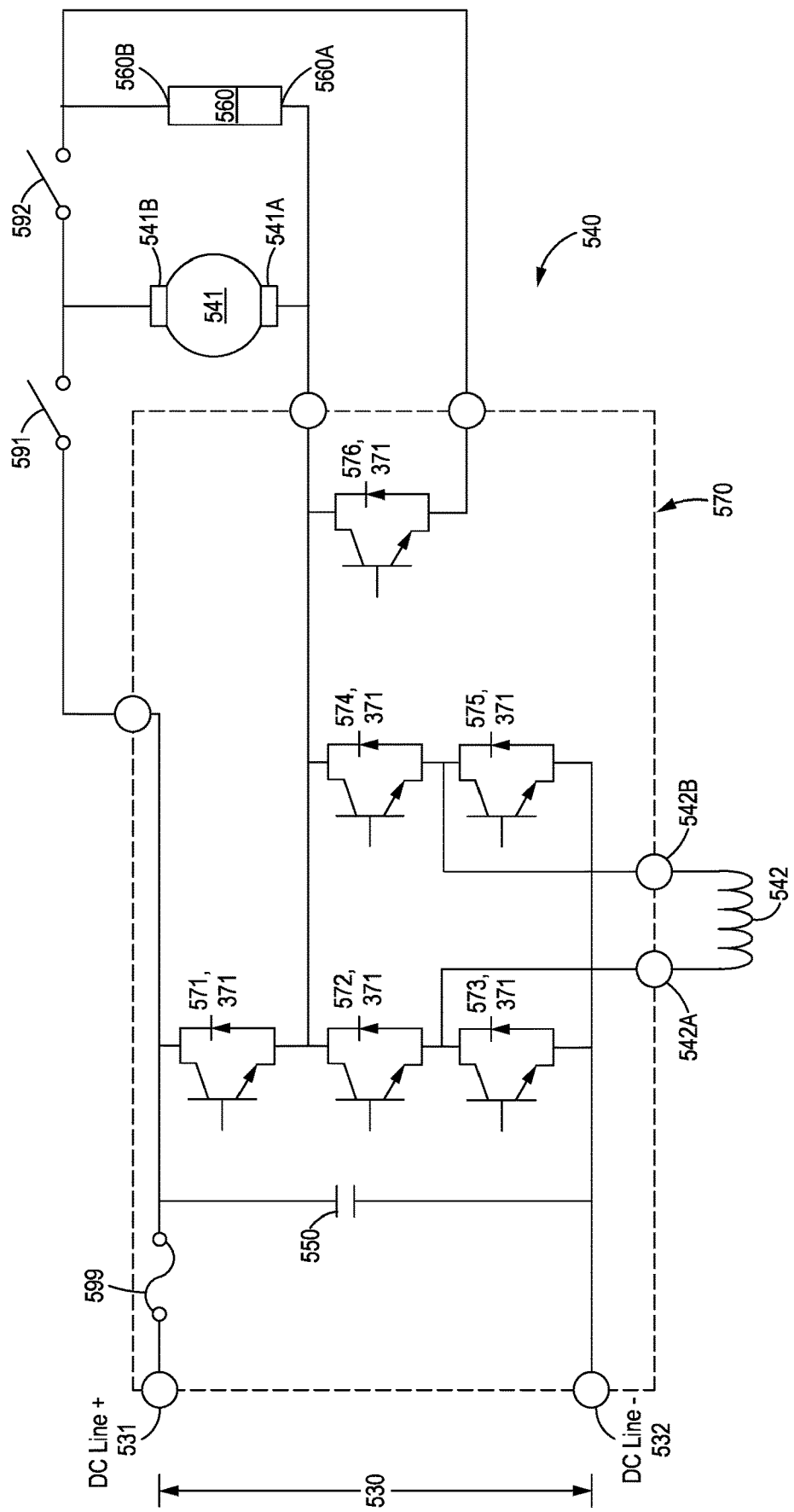
FIG. 5 is an electrical schematic of a first chopper circuit according to another embodiment of the present disclosure.

Turning now to FIG. 5, an electrical schematic of a first chopper circuit for a locomotive 300 utilizing a series-wound DC traction motor is generally referred to by a reference numeral 540. With regard to FIGS. 5-10 and their relevant disclosures, it should be understood that the various circuit notations employed herein, such as the terms 'positive', 'negative', 'first terminal', 'second terminal', etc., are for reference purposes only, and that other notations, reference systems, or configurations may exist without departing from the scope of the present disclosure. For the purposes of this disclosure, a series-wound DC motor may refer to a self-excited DC motor comprising a series-connected armature and field winding, and may be capable of operating in a motoring mode and a dynamic braking mode.

As seen in FIG. 5, the first chopper circuit 500 may comprise a DC power bus 530; an energy storage device 550; a series-wound DC motor 540, including an armature 541 and a field winding 542; a resistor grid 560; a first switch 591; a second switch 592; and a plurality of power semiconductors 570. A variable switching frequency of each power semiconductors 570 may control a current through each of the armature 541, the field winding 542, the energy storage device 550, and the resistor grid 560, as described in greater detail below.

The DC power bus 530 may include a positive line 531 and a negative line 532, and may be the primary power bus for the locomotive 300. The energy storage device 550 may be connected across the positive line 531 and the negative line 532, and may be capable of both charging power from and discharging power to the DC power bus 530. The series-wound DC motor 540 may include an armature 541 having a first terminal 541A and a second terminal 541B; and a field winding 542 having a first terminal 542A and a second terminal 542B, wherein the field winding 542 may be controllably connected in series with the armature 541 across the positive line 531 and the negative line 532. The resistor grid 560 may also comprise a first terminal 560A and a second terminal 560B, wherein the first terminal 560A of the resistor grid 560 is connected to the first terminal 541A of the armature 541. The first switch 591 may connect the second terminal of the armature 541B to the positive line 531; and the second switch 592 may connect the second terminal of the armature 541B to the second terminal of the resistor grid 560B.

In some embodiments, the DC power bus 530 may be controllably disconnected from the primary bus of the locomotive 300, e.g. by opening or closing a third switch 599, thereby forming an isolated circuit. In the same or other embodiments, the resistor grid 560 may comprise any number of resistive elements, and may be configured in resistor strings, ladders, etc., where no limitation is intended herein. Furthermore, while switches 591-593 are employed in the present embodiment, these are exemplary only, and other switching devices, such as contactors, relays, isolators, and the like may be employed in comparable embodiments.

With continued reference to FIG. 5, the plurality of power semiconductors 570 may specifically include a first power semiconductor 571 connecting the first terminal of the armature 541A to the positive line 531; a second power semiconductor 572 connecting the first terminal of the field winding 542A to the first terminal of the armature 541A, in series with the first power semiconductor 571; a third power semiconductor 573 connecting the first terminal of the field winding 542A to the negative line 532; a fourth power semiconductor 574 connecting the second terminal of the field winding 542B to the first terminal of the armature 541A, in series with the first power semiconductor 571; a fifth power semiconductor 575 connecting the second terminal of the field winding 542B to the negative line 532; and a sixth power semiconductor 576 connecting the second terminal 560B of the resistor grid 560 to the first terminal of the armature 541A.

In an embodiment, each power semiconductor 570 may include a collector terminal, an emitter terminal, and a gate terminal; each power semiconductor 570 may be reverse voltage blocking, i.e. enabling current flow from the negative line 832 to the positive line 831 only; and/or each power semiconductor 570 may operate in an open state, i.e. disconnected, a closed state, i.e. connected, or a switching state, as controlled by a gate signal. In some embodiments, each power semiconductor 570 may be an IGBT 371 whose gate signal is controlled by the energy management device 30, for example, through a PWM signal. In some embodiments, the first chopper circuit 500 may yet further comprise additional power semiconductors (not shown) having various functionality; and/or the chopper circuit 500 may comprise additional circuit elements, such as but not limited to contactors, relays, circuit breakers, transistors, diodes, resistors, capacitors, and the like, without departing from the scope from the present disclosure.

Figure 6:
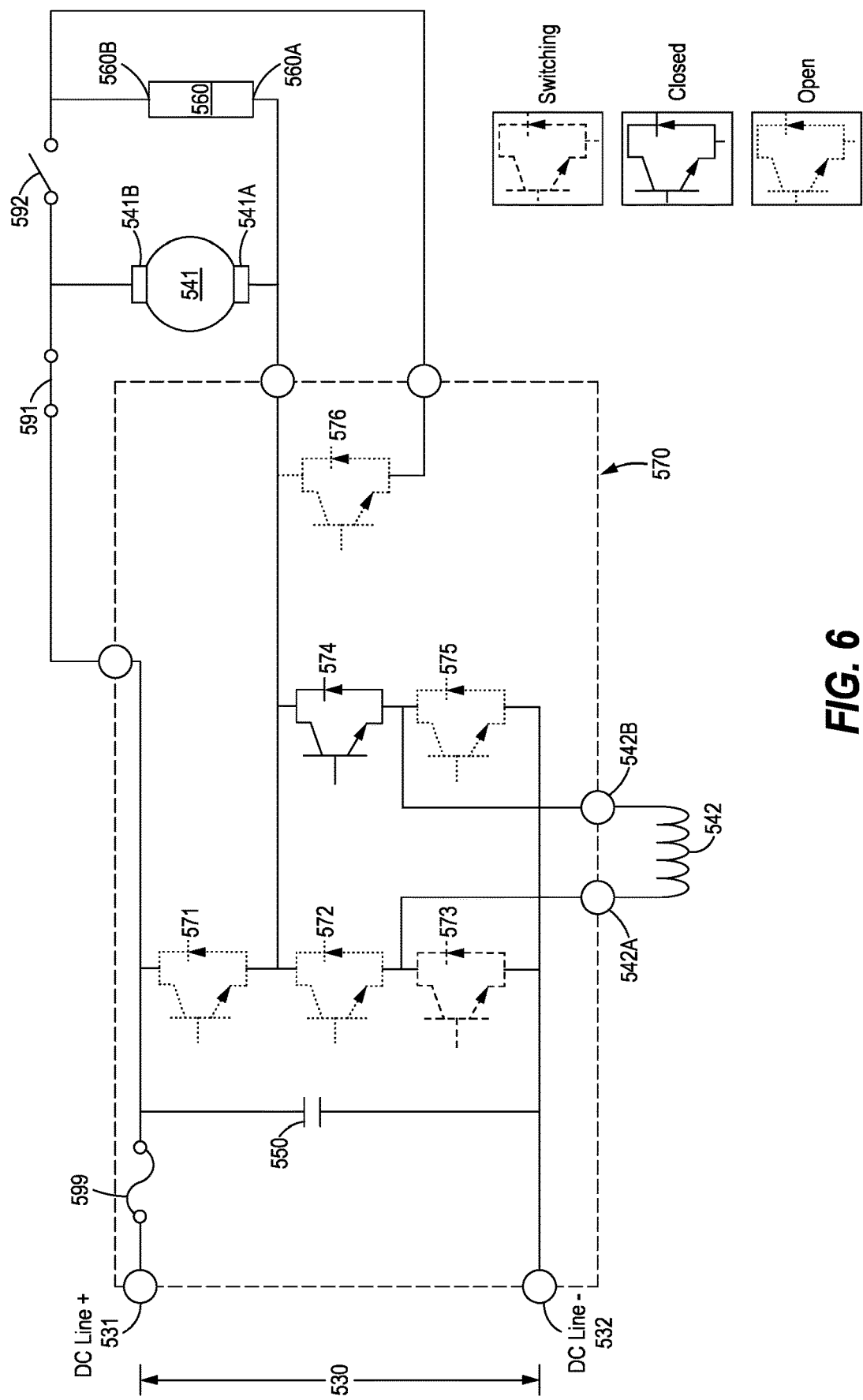
FIG. 6 is an electrical schematic displaying a configuration of the first chopper circuit during a motoring mode of the locomotive.

Turning now to FIG. 6, a configuration of the first chopper circuit 500 is shown wherein the traction motor 540 is operating in the motoring mode. During the motoring mode, the first switch 591 is closed the second switch 592 is open. Thus, it may be understood that the armature 541 and the field winding 542 are connected in series across the positive line 531 and the negative line 532. Further, one of the second power semiconductor 572 and the fifth power semiconductor 575 is closed and the other is switching; or one of the third power semiconductor 573 and the fourth power semiconductor 574 is closed and the other is switching. The remaining power semiconductors 570 are open. Consequently, the resistor grid 560 is disconnected and no power is dissipated therein. It may also be understood that the second through fifth power semiconductors 572-575 may form an H-bridge around the field winding 542, thereby controlling a polarity of the passing current. In either polarity, however, the current through the field winding 542 and, subsequently, the armature 541, may be controlled by a switching frequency of one of the second power semiconductor 572, third power semiconductor 573, fourth power semiconductor 574, or fifth power semiconductor 575, i.e. whichever is the switching power semiconductor 570. In summary, during the motoring mode, the chopper circuit 500 may control a current through the series-wound DC motor 540 via a switching frequency of the power semiconductors 570.

Figure 7:
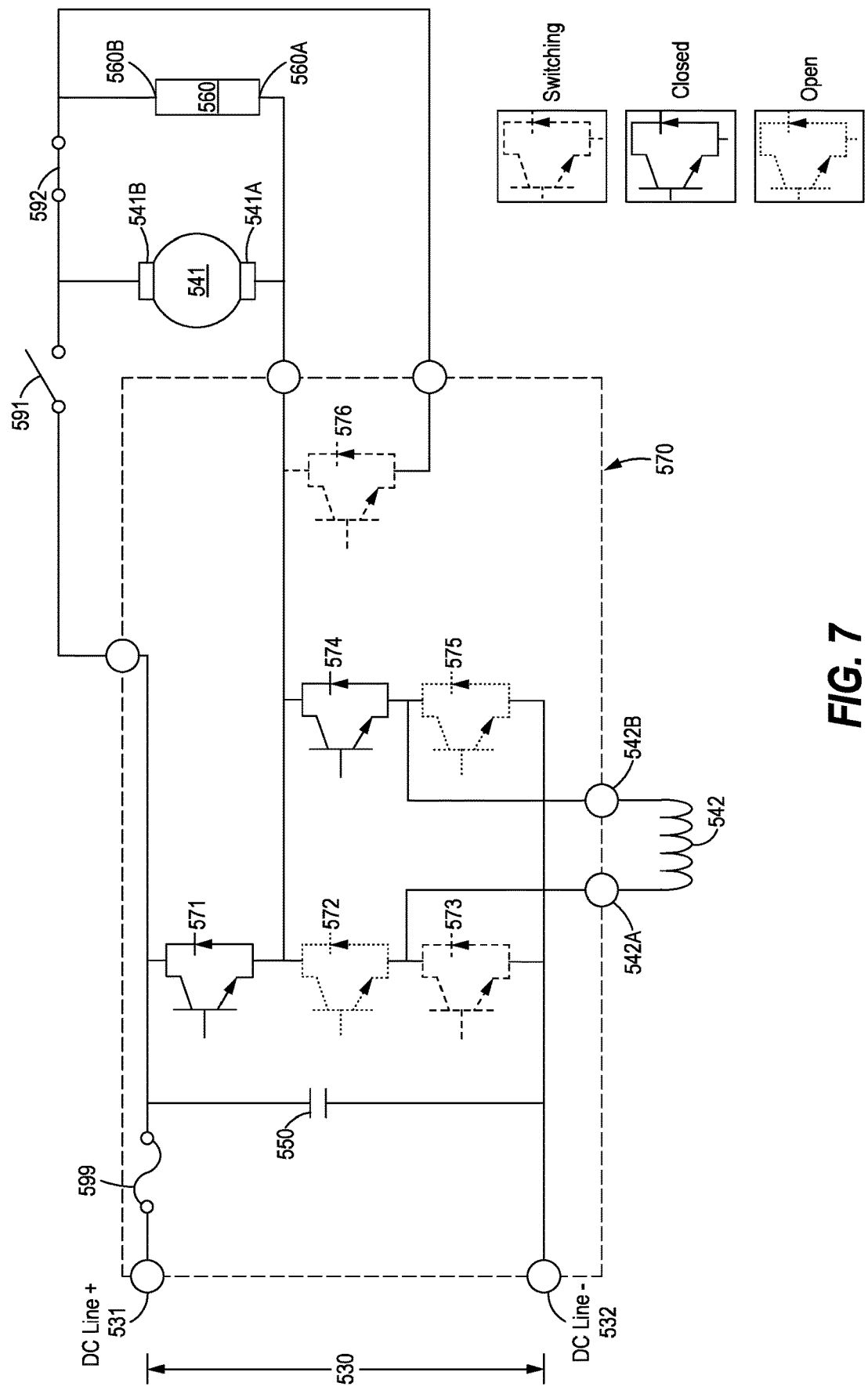
FIG. 7 is an electrical schematic displaying a configuration of the first chopper circuit during a dynamic braking mode of the locomotive.

Turning now to FIG. 7, a configuration of the chopper circuit 500 wherein the traction motor 540 is operating in the dynamic braking mode is shown. During the dynamic braking mode, the first switch 591 is open and the second switch 592 is closed. Further, the first power semiconductor 571 is closed; the sixth power semiconductor 576 is switching; and one of the second power semiconductor 572 and the fifth power semiconductor 575 is closed and the other is switching; or one of the third power semiconductor 573 and the fourth power semiconductor 574 is closed and the other is switching. The remaining power semiconductors 570 are open.

It may be understood that the second through fifth power semiconductors 572-575 form an H-bridge around the field winding 542, thereby controlling a polarity of the passing current. In either polarity, however, the current through the field winding 542 may be controlled by a switching frequency of one of the second power semiconductor 572, third power semiconductor 573, fourth power semiconductor 574, or fifth power semiconductor 575, i.e. whichever is the switching power semiconductor 570. It is worth noting that, during the dynamic braking mode, the armature 541 and the field winding 542 may no longer be connected in series across the positive line 531 and the negative line 532.

With continued reference to FIG. 7, a current through the resistor grid 560 may be controlled by a switching frequency of the sixth power semiconductor 576. By controlling a current through the resistor grid 560, a power dissipation therein may be allocated and effectively diverted from the DC power bus 530 and charging the energy storage device 550. Thus, according to some embodiments, a current through the energy storage device 550 may likewise be operatively controlled by the switching frequency of the sixth power semiconductor 576. In summary, during the dynamic braking mode, the chopper circuit 500 may control a current through each of the field winding 542, the resistor grid 560, and the energy storage device 550 via a switching frequency of the second through sixth power semiconductors 572-576.

Figure 8:
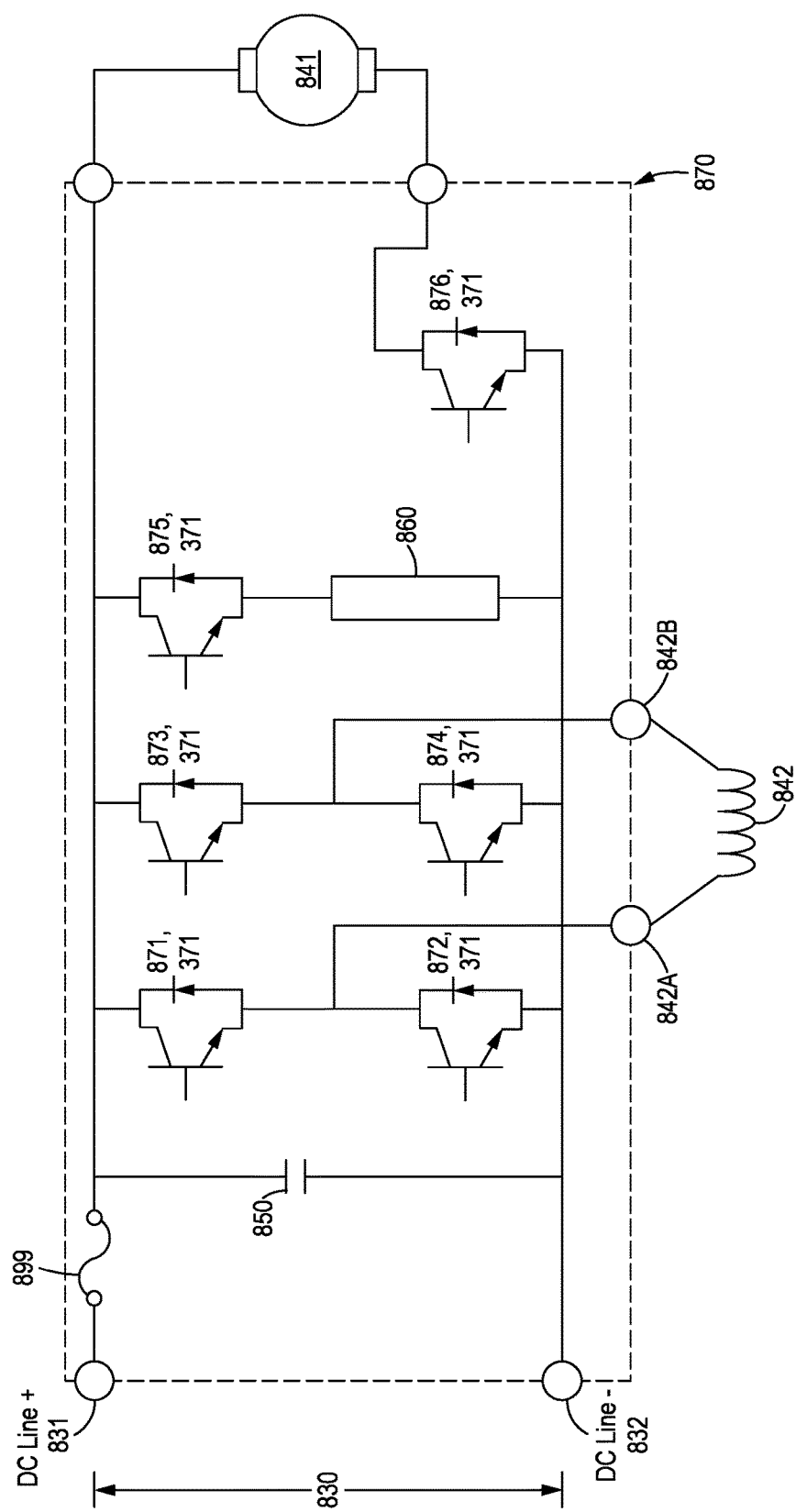
FIG. 8 is an electrical schematic of a second chopper circuit according to yet another embodiment of the present disclosure.

Turning now to FIG. 8, an electrical schematic of a second chopper circuit for a locomotive 300 utilizing a DC shunt motor is generally referred to by a reference numeral 800. For the purposes of this disclosure, a DC shunt motor may refer to a DC motor comprising an armature and a field winding connected in parallel, and may be capable of operating in a motoring mode and a dynamic braking mode.

As shown in FIG. 8, the second chopper circuit 800 may comprise a DC power bus 830; an energy storage device 850; a DC shunt motor 840, including an armature 841 and a field winding 842; a resistor grid 860; and a plurality of power semiconductors 870. A variable switching frequency of each power semiconductor 870 may control a current through each of the armature 841, the field winding 842, the energy storage device 850, and the resistor grid 860, as described in greater detail below.

The DC power bus 830 may include a positive line 831 and a negative line 832, and may be the primary power bus from the locomotive 300. The energy storage device 850 may be connected across the positive line 831 and the negative line 832, and may be capable of both charging power from and discharging power to the DC power bus 830. The DC shunt motor 840 may include an armature 841 and a field winding 842, the field winding 842 having a first terminal 842A and a second terminal 842B. Each of the armature 841, the field winding 842, and the resistor grid 860 may be controllably connected across the positive line 831 and the negative line 832. According to some configurations, the armature 841, field winding 842, energy storage device 850, and resistor grid 860 may be connected in parallel across the positive line 831 and the negative line 832.

In some embodiments, the DC power bus 830 may be controllably disconnected from the primary bus of the locomotive 300, e.g. by opening or closing a first switch 899, thereby forming an isolated circuit. In the same or other embodiments, the resistor grid 860 may comprise any number of resistive elements, and may be configured in resistor strings, ladders, etc., where no limitation is intended herein. Furthermore, while a switch 599 is employed in the present embodiment, other switching devices, such as contactors, relays, isolators, and the like may be employed in comparable embodiments.

With continued reference to FIG. 8, the plurality of power semiconductors 870 may specifically include a first power semiconductor 871 connecting the first terminal of the field winding 842A to the positive line 831; a second power semiconductor 872 connecting the first terminal of the field winding 842A to the negative line 832; a third power semiconductor 873 connecting the second terminal of the field winding 842B to the positive line 831; a fourth power semiconductor 874 connecting the second terminal of the field winding 842B to the negative line 832; a fifth power semiconductor 875 in series with the resistor grid 860; and a sixth power semiconductor 876 in series with the armature 841.

In an embodiment, each power semiconductor 870 may include a collector terminal, an emitter terminal, and a gate terminal; each power semiconductor 870 may be reverse voltage blocking; and/or each power semiconductor 870 may operate in an open state, closed state, or a switching state, as controlled by a gate signal. In some embodiments, each power semiconductor 870 may be an IGBT 371 whose gate signal is controlled by the energy management device 30, for example, through a PWM signal. In various embodiments, the second chopper circuit 800 may yet comprise additional power semiconductors (not shown) having various functionality. For example, a seventh power semiconductor may be implemented in series with the fifth power semiconductor 875 and in parallel with the resistor grid 860, thereby enabling an ability to short the resistor grid 860. Similarly, an eighth power semiconductor may be implemented in series with the sixth power semiconductor 876 and in parallel with the armature 841, thereby enabling an ability to short the armature 841. And in yet other embodiments, multiple power semiconductors may be introduced to form an H-bridge around the resistor grid 860. Without limitation, the chopper circuit 800 may comprise additional circuit elements, such as contactors, relays, circuit breakers, transistors, diodes, resistors, capacitors, and the like, without departing from the scope of the present disclosure.

Figure 9:
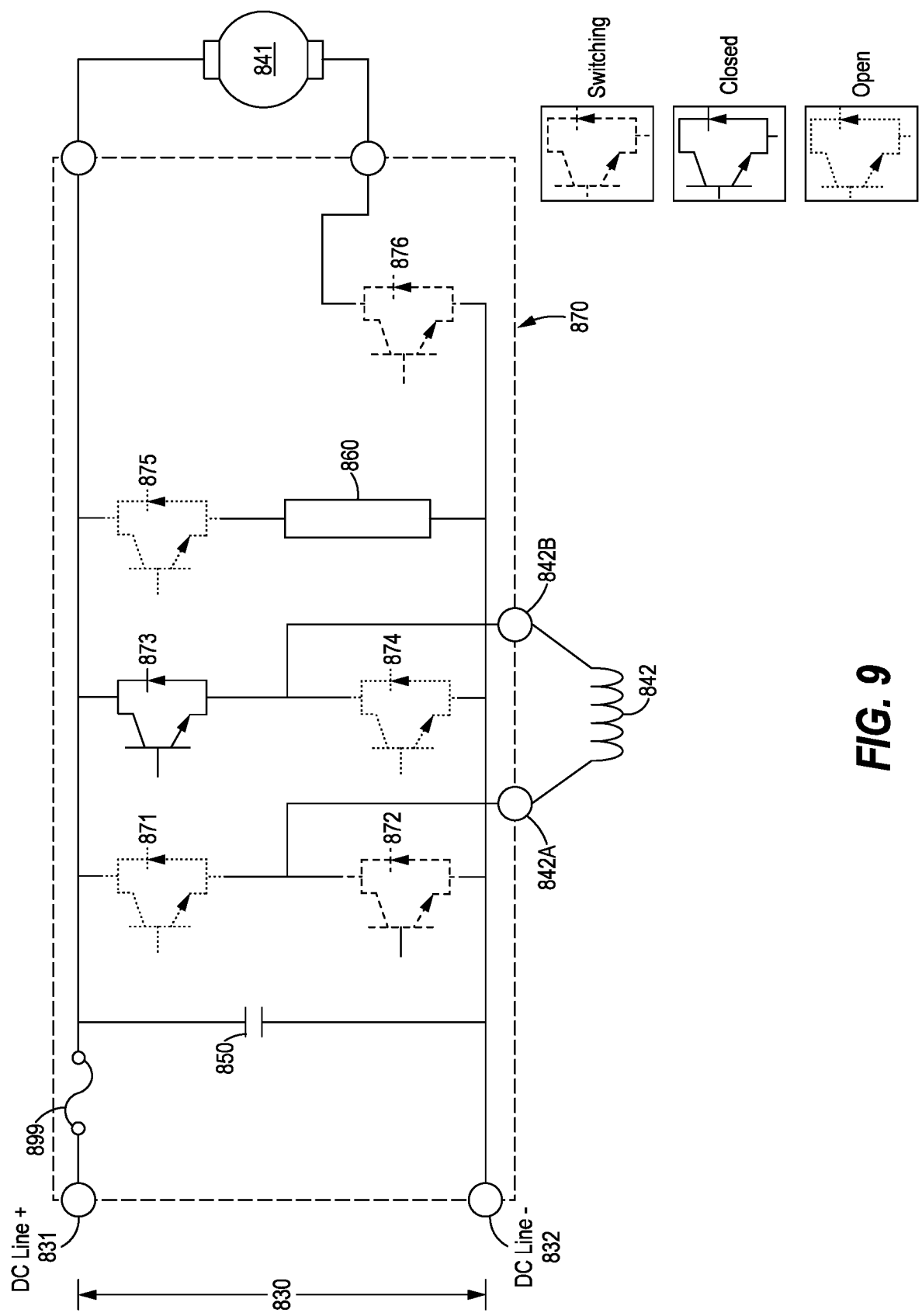
FIG. 9 is an electrical schematic displaying a configuration of the second chopper circuit during a motoring mode of the locomotive.

Turning now to FIG. 9, a configuration of the second chopper circuit is shown wherein the traction motor 840 is operating in the motoring mode. During the motoring mode, the sixth power semiconductor 876 is switching; and one of the second power semiconductor 872 and third power semiconductor 873 is closed and the other is switching; or one of the first power semiconductor 871 and the fourth power semiconductor 874 is closed and the other is switching. The remaining power semiconductors 870 are open. Consequently, the resistor grid 860 is disconnected and no power is dissipated therein. It may also be understood that the first through fourth power semiconductors 871-874 form an H-bridge around the field winding 842, thereby controlling a polarity of the passing current. In either polarity, however, the current through the field winding 842 may be controlled by a switching frequency of one of the first power semiconductor 871, second power semiconductor 872, third power semiconductor 873, or fourth power semiconductor 874, i.e. whichever is the switching power semiconductor. Likewise, a current through the armature 841 may be controlled by a switching frequency of the sixth power semiconductor 876. In summary, during the motoring mode, the chopper circuit 800 may control a current through each of the armature 841 and the field winding 842 via a switching frequency of the power semiconductors 870.

Figure 10:
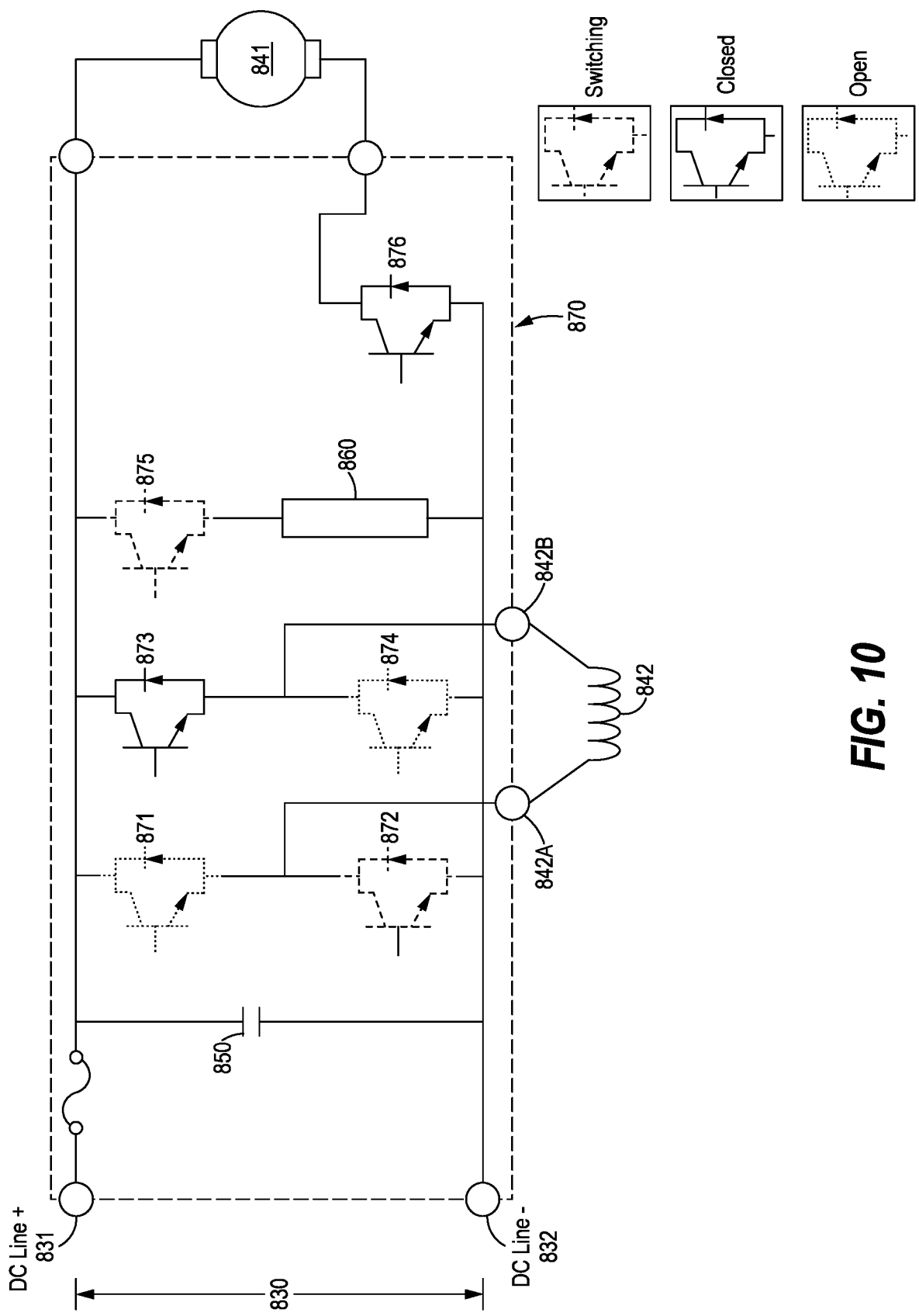
FIG. 10 is an electrical schematic displaying a configuration of the second chopper circuit during a dynamic braking mode of the locomotive.

Turning now to FIG. 10, a configuration of the chopper circuit 800 wherein the traction motor 840 is operating in the dynamic braking mode is shown. During the dynamic braking mode, one of the second power semiconductor 872 and the third power semiconductor 873 is closed and the other is switching; or one of the first power semiconductor 871 and the fourth power semiconductor 874 is closed and the other is switching. Further, the fifth power semiconductor 875 is switching; the sixth power semiconductor 876 is closed; and the remaining power semiconductors 870 are open. It may be understood that the first through fourth power semiconductors 871-874 may form an H-bridge around the field winding 842, thereby controlling a polarity of the passing current. In either polarity, however, the current through the field winding 842 may be controlled by a switching frequency of one of the first power semiconductor 871, second power semiconductor 872, third power semiconductor 873, or fourth power semiconductor 874, i.e. whichever is the switching power semiconductor.

With continued reference to FIG. 10, a current through the resistor grid 860 may be controlled by a switching frequency of the fifth power semiconductor 875. By controlling a current through the resistor grid 860, a power dissipation therein may be allocated and effectively diverted from the DC power bus 830 and charging the energy storage device 850. Thus, according to some embodiments, a current through the energy storage device 850 may likewise be operatively controlled by the switching frequency of the fifth power semiconductor 875. In summary, during the dynamic braking mode, the chopper circuit 800 controls a current through each of the field winding 842, the energy storage device 850, and the resistor grid 860 via a switching frequency of the power semiconductors 870.

By implementing the chopper circuits 500, 800 presently disclosed, a locomotive 300 may be endowed with both a hybrid power supply and dynamic braking functionality. Accordingly, a power supplied to the traction motors 340 during a motoring mode may be finely controlled, while a power allocated to the energy storage device 350 and resistor grid 360 during a dynamic braking mode may be precisely balanced.

INDUSTRIAL APPLICATION

The present application may find industrial applicability toward any number of locomotives, and may be particularly useful toward both internal combustion locomotives and hybrid locomotives.

For example, the present disclosure may be applied toward retrofitting internal combustion locomotives, such as diesel-electric locomotives, petrol-electric locomotives, and locomotives having comparable powertrains which include both prime movers and electric motors. Such locomotives may burn, without limitation, diesel, petrol, biodiesel, kerosene, naphthalene, natural gas, and/or other alternative combustive fuels to drive its prime mover; and may supply electric power to one or more traction motors. Advantageously, the existing infrastructure of such locomotives may be capitalized; and the disclosed chopper circuits and energy storage device readily implemented across the transmissions therein to enable dynamic braking functionality. Accordingly, such locomotives may be enabled to recapture energy from braking, thereby increasing an operating efficiency without substantial hardware changes.

The present disclosure may also be applied toward hybrid locomotives which already include an energy storage device and which are previously capable of dynamic braking. Such locomotives may capture energy derived from dynamic braking through batteries, flywheels, hydrogen fuel cells, compressed air, and/or other energy storage technologies. Regardless, the claimed chopper circuits may be implemented, and may replace existing power bus circuity, to further improve an efficiency, control, and precision of power allocation. More specifically, the disclosed chopper circuits may provide superior current and/or voltage allocation to each of the traction motors, the energy storage device, and the resistive elements, as compared to prior art technology, and without prohibitive cost.

The disclosed chopper circuits may be applied to a single traction motor or coupled with each of a plurality of traction motors in the locomotive. Moreover, the locomotive may be employed as, without limitation, a single, self-propelled carriage; the motive power for a train or consist; one of many carriages comprising a multiple-unit train; and yet other consist configurations. For example, the locomotive may be employed in a passenger train, freight train, motor coach, railcar, or shunter, among other possibilities.

Finally, the present disclosure may be relevant toward other categories of hybrid vehicle which utilize diesel-electric or petrol-electric transmissions, such as but not limited to subways, trams, motorships, cruise ships, submarines, buses, automobiles, and industrial machines.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The invention claimed is:

1. A locomotive comprising:
a prime mover;
a converter mechanically coupled to the prime mover;
an energy management device; and
a DC power bus being supplied electric power by the converter, wherein the DC power bus is controllably connected through a chopper circuit to:
   a traction motor capable of operating in a motoring mode and a dynamic braking mode, the traction motor including a DC shunt motor;
   an energy storage device capable of capturing electric power from and supplying electric power to the DC power bus; and
   a resistor grid capable of dissipating electric power as heat;
wherein the chopper circuit includes a plurality of power semiconductors, each having a variable switching frequency, and is controlled by the energy management device to control a current supplied to each of the traction motor, the energy storage device, and the resistor grid;
during the motoring mode, the energy management device is configured to operatively control, through the chopper circuit, a current supplied to the traction motor; and
during the dynamic braking mode, the energy management device is configured to operatively control, through the chopper circuit, a power distribution between the energy storage device and the resistor grid.

2. The locomotive according to claim 1, wherein:
the prime mover includes an internal combustion engine; and
the converter includes a three-phase alternator and a three-phase rectifier.

3. The locomotive according to claim 2, further comprising a plurality of traction motors, each electrically connected through a chopper circuit to the DC power bus, and each capable of operating in the motoring mode and the dynamic braking mode.

4. The locomotive according to claim 2, wherein
each of the plurality of power semiconductors in the chopper circuit is an insulated-gate bipolar transistor (IGBT).

5. The locomotive according to claim 1, wherein the energy storage device is a rechargeable battery and/or a flywheel.

6. The locomotive according to claim 1, the locomotive having a first operating mode during which:
a traction power requirement is equal to a power output of the prime mover;
the energy management device is configured to control the chopper circuit to supply power to the traction motor exclusively from the prime mover through the DC power bus; and
the traction motor operates in the motoring mode.

7. The locomotive according to claim 6, the locomotive having a second operating mode during which:
the traction power requirement exceeds the power output of the prime mover;
the energy management device is configured to control the chopper circuit to supply power to the traction motor from both the prime mover and the energy storage device; and
the traction motor operates in the motoring mode.

8. The locomotive according to claim 7, the locomotive having a third operating mode during which:
the power output of the prime mover is zero;
the energy management device is configured to control the chopper circuit to supply power to the traction motor exclusively from the energy storage device; and
the traction motor operates in the motoring mode.

9. The locomotive according to claim 8, the locomotive having a fourth operating mode during which:
the locomotive is braking and the power output of the prime mover is zero;
the traction motor operates in the dynamic braking mode; and
the energy management device is configured to control the chopper circuit to distribute a power output of the traction motor between the energy storage device and the resistor grid through the DC power bus.

10. A chopper circuit for a locomotive comprising:
a DC power bus including a positive line and a negative line;
an energy storage device connected across the positive line and the negative line, the energy storage device capable of charging power from and discharging power to the DC power bus;
a DC shunt motor capable of operating in a motoring mode and a dynamic braking mode, the DC shunt motor including:
   an armature controllably connected across the positive line and the negative line;
   a field winding controllably connected across the positive line and the negative line;
a resistor grid controllably connected across the positive line and the negative line; and
a plurality of power semiconductors, each having a variable switching frequency, which control a current through each of the armature, the field winding, the energy storage device, and the resistor grid
wherein during the motoring mode, the chopper circuit is configured to control the current supplied to the DC shunt motor; and
wherein during the dynamic braking mode, the chopper circuit is configured to control the current through each of the field winding, the energy storage device, and the resistor grid via a switching frequency of the plurality of power semiconductors.

11. The chopper circuit according to claim 10, the plurality of power semiconductors further including:
a first power semiconductor connecting a first terminal of the field winding to the positive line;
a second power semiconductor connecting the first terminal of the field winding to the negative line;
a third power semiconductor connecting a second terminal of the field winding to the positive line;
a fourth power semiconductor connecting the second terminal of the field winding to the negative line;
a fifth power semiconductor in series with the resistor grid; and a sixth power semiconductor in series with the armature;
wherein each power semiconductor is reverse voltage blocking and includes a gate terminal.

12. The chopper circuit according to claim 11, wherein during the motoring mode:
one of the second power semiconductor and the third power semiconductor is closed and the other is switching; or
one of the first power semiconductor and the fourth power semiconductor is closed and the other is switching;
the sixth power semiconductor is switching; and
the remaining power semiconductors are open;
wherein the chopper circuit operates such that:
a current through the field winding is controlled by a switching frequency of the first power semiconductor, the second power semiconductor, the third power semiconductor, or the fourth power semiconductor;
a current through the armature is controlled by a switching frequency of the sixth power semiconductor; and
the resistor grid is disconnected.

13. The chopper circuit according to claim 11, wherein during the dynamic braking mode:
one of the second power semiconductor and the third power semiconductor is closed and the other is switching; or
one of the first power semiconductor and the fourth power semiconductor is closed and the other is switching;
the fifth power semiconductor is switching;
the sixth power semiconductor is closed; and
the remaining power semiconductors are open;
wherein the chopper circuit operates such that:
a current through the field winding is controlled by a switching frequency of the first power semiconductor, the second power semiconductor, the third power semiconductor, or the fourth power semiconductor;
a current through the resistor grid is controlled by a switching frequency of the fifth power semiconductor; and
a current through the energy storage device is operatively controlled by a switching frequency of the fifth power semiconductor.

14. The chopper circuit according to claim 11, wherein each power semiconductor is an IGBT being controlled by an energy management device.

15. A chopper circuit for a locomotive comprising:
a DC power bus including a positive line and a negative line;
an energy storage device connected across the positive line and the negative line, the energy storage device capable of charging power from and discharging power to the DC power bus;
a series-wound DC motor capable of operating in a motoring mode and a dynamic braking mode, the series-wound DC motor including:
an armature having a first terminal and a second terminal;
a field winding having a first terminal and a second terminal, the field winding controllably connected in series with the armature across the positive line and the negative line;
a resistor grid having a first terminal and a second terminal, the first terminal of the resistor grid being connected to the first terminal of the armature;
a first switch connecting the second terminal of the armature to the positive line;
a second switch connecting the second terminal of the armature to the second terminal of the resistor grid; and
a plurality of power semiconductors, each having a variable switching frequency, which control a current through each of the armature, the field winding, the energy storage device, and the resistor grid
wherein during the motoring mode, the chopper circuit is configured to control the current supplied to the series-wound DC motor; and
wherein during the dynamic braking mode, the chopper circuit is configured to control a power distribution between the energy storage device and the resistor grid.

16. The chopper circuit according to claim 15, the plurality of power semiconductors further including:
a first power semiconductor connecting the first terminal of the armature to the positive line;
a second power semiconductor connecting the first terminal of the field winding to the first terminal of the armature, in series with the first power semiconductor;
a third power semiconductor connecting the first terminal of the field winding to the negative line;
a fourth power semiconductor connecting the second terminal of the field winding to the first terminal of the armature, in series with the first power semiconductor;
a fifth power semiconductor connecting the second terminal of the field winding to the negative line; and
a sixth power semiconductor connecting the second terminal of the resistor grid to the first terminal of the armature;
wherein each power semiconductor is reverse voltage blocking and includes a gate terminal.

17. The chopper circuit according to claim 16, wherein during the motoring mode:
the first switch is closed;
the second switch is open;
one of the second power semiconductor and the fifth power semiconductor is closed and the other is switching; or
one of the third power semiconductor and the fourth power semiconductor is closed and the other is switching; and
the remaining power semiconductors are open;
wherein the chopper circuit operates such that:
a current through the series-wound DC motor is controlled by a switching frequency of the second power semiconductor, the third power semiconductor, the fourth power semiconductor, or the fifth power semiconductor; and
the resistor grid is disconnected.

18. The chopper circuit according to claim 16, wherein during the dynamic braking mode:
the first switch is open;
the second switch is closed;
the first power semiconductor is closed;
one of the second power semiconductor and the fifth power semiconductor is closed and the other is switching; or
one of the third power semiconductor and the fourth power semiconductor is closed and the other is switching;
the sixth power semiconductor is switching; and
the remaining power semiconductors are open;
wherein the chopper circuit operates such that:
a current through the field winding is controlled by a switching frequency of the second power semiconductor, the third power semiconductor, the fourth power semiconductor, or the fifth power semiconductor;

a current through the resistor grid is controlled by a switching frequency of the sixth power semiconductor; and a current through the energy storage device is operatively controlled by a switching frequency of the sixth power semiconductor.

19. The chopper circuit according to claim 16, wherein each power semiconductor is an IGBT being controlled by an energy management device.

* * * * *